United States Patent
Reaves et al.

[11] Patent Number: 5,939,479
[45] Date of Patent: Aug. 17, 1999

[54] REMOVABLE AND GUILLOTINABLE EMULSION PRESSURE-SENSITIVE ADHESIVES

[75] Inventors: Jessie C. Reaves, Los Angeles; Shiaonung J. Su, Buena Park; Peter R. von Kleist, Rialto, all of Calif.

[73] Assignee: Avery Dennison Corporation, Pasadena, Calif.

[21] Appl. No.: 07/795,981

[22] Filed: Nov. 22, 1991

[51] Int. Cl.⁶ .................................................. C08K 91/06

[52] U.S. Cl. ........................................... 524/276; 524/475

[58] Field of Search ..................................... 524/377, 378, 524/277, 763, 487–488, 489, 276, 475; 428/42, 348–349, 355

[56] References Cited

U.S. PATENT DOCUMENTS

| | | | |
|---|---|---|---|
| 3,919,149 | 11/1975 | Cushman et al. | 524/489 |
| 4,716,194 | 12/1987 | Walker | 524/806 |
| 4,783,354 | 11/1988 | Fagan | 428/355 |
| 4,845,149 | 7/1989 | Frazee | 524/458 |
| 4,925,908 | 5/1990 | Bernard et al. | 428/355 |
| 5,049,608 | 9/1991 | Medina | 524/556 |
| 5,059,479 | 10/1991 | Yuyama et al. | 428/355 |
| 5,196,504 | 3/1993 | Scholz | 524/460 |
| 5,278,227 | 1/1994 | Bernard | 524/833 |
| 5,409,977 | 4/1995 | Sitaramiah | 524/247 |

*Primary Examiner*—Paul R. Michl
*Attorney, Agent, or Firm*—Christie, Parker & Hale, LLP

[57] ABSTRACT

There is provided a removable, repositionable and guillotinable pressure-sensitive construction comprising a backing having thereon an acrylic emulsion adhesive modified by a wax surfactant or mixtures thereof.

6 Claims, 2 Drawing Sheets

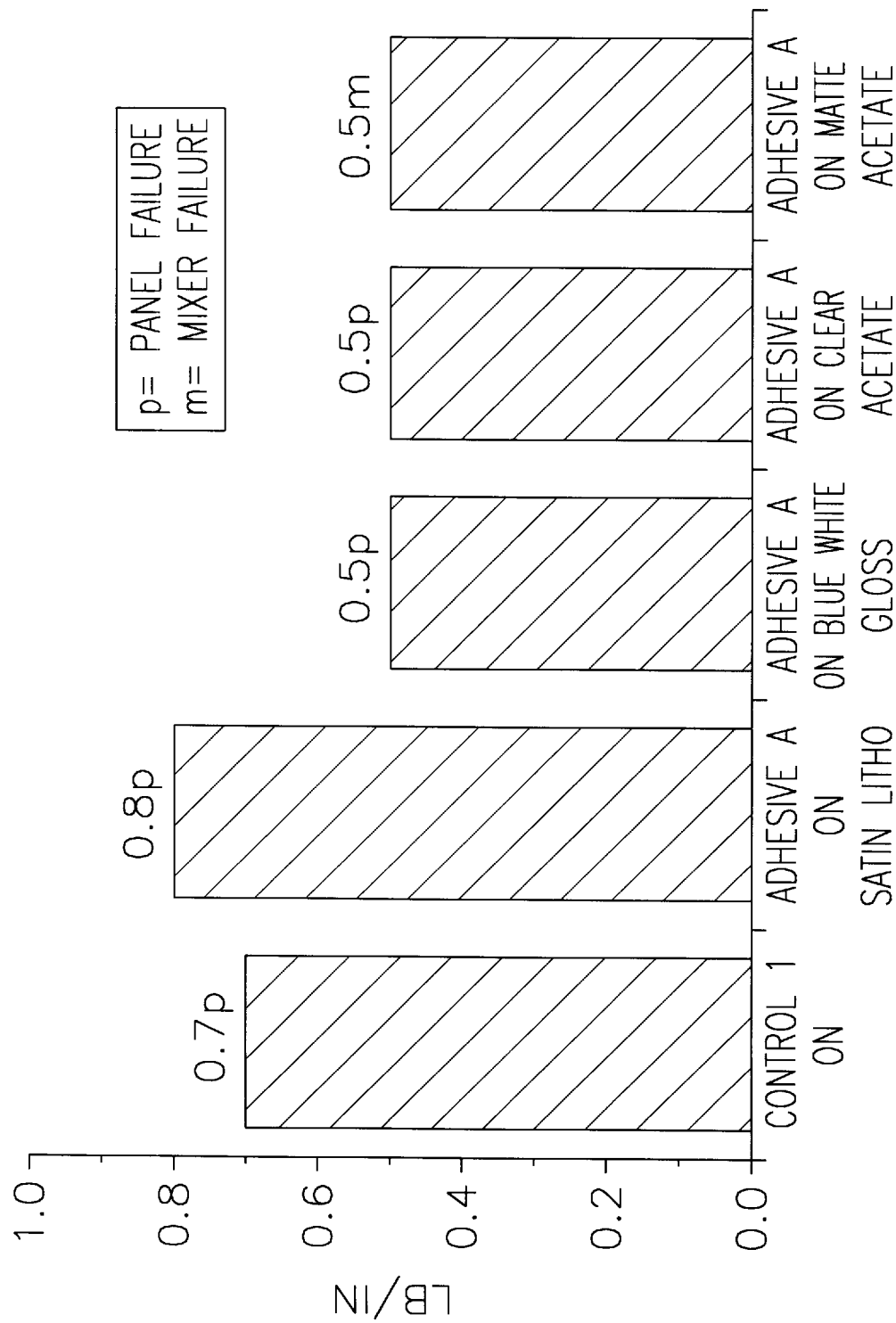

REMOVABLE AND GUILLOTINABLE EMULSION PRESSURE-SENSITIVE ADHESIVES

FIELD OF THE INVENTION

The invention is directed to pressure-sensitive adhesives that exhibit clean removability from various substrates without sacrificing guillotinability.

BACKGROUND OF THE INVENTION

It is well known in the pressure-sensitive adhesives industry that two approached have been tried to achieve a good removability, namely, the controlled coating processes and/or adhesive rheology.

If the coat weight of the adhesive is controlled within a certain range, the adhesive will exhibit a reduced peel force and will have a removable behavior for a short period of time. However, due to the inherent permanent characteristic of most adhesives, the adhesion will grow with age and become a non-removable.

An alternative is to use a discontinuous coat of adhesive segments or miscrospheres providing in effect a reduced coat weight. This approach is based on adhesion microspheres described in U.S. Pat. No. 3,691,140 to Silver, U.S. Pat. No. 4,166,152 to Baker et al, U.S. Pat. Nos. 4,495,318 and 4,598,212 to Howard, U.S. Pat. 4,810,763 to Mallya et al and adhesive segment described in European Patent 0180598, each incorporated herein by reference.

The rheological approach has been to design a high gel, low Tg adhesive which has a low tangent delta at the debonding frequency. These rheological properties enable the adhesive to behave like a soft material and have a low adhesion force during the peel test. This rheological approach, however, generates problems in the guillotine process.

In other words, good removability and good guillotinabilty are often properties which are contradictory to each other. The latter is a must requirement for all adhesives used in the offset sheeting business.

There have also been other attempts to formulate an adhesive to reduce the bonding between an adhesive and knife during the guillotine process. Polyalkalene glycols such as polyethylene glycol (PEG) has been used to achieve this property with tackified water insoluble elastomers as described in U.S. Pat. No. 4,548,845 to Parsons et al incorporated herein by reference, but phase separation and incompatibility between the adhesive system and PEG have limited its amount and usage. Silicone as described for instance in U.S. Pat. No. 4,151,319 to Sackoff and U.S. Pat. No. 4,346,189 to Laurant each incorporated herein by reference have also been suggested. The products display good guillotinability, and initial repositionability. Repositionability, however, is lost with time.

It would be desirable to provide a pressure-sensitive adhesive composition which exhibits removable and repositionable properties which do not deteriorate with age, as well as good guillotinability for use in offset printing applications.

BACKGROUND OF THE INVENTION

According to the present invention there is provided pressure-sensitive adhesives which exhibit removable and repositionable characteristics to certain substrates and which retains that property for protracted periods of time and offers, as well, excellent guillotinability. This result is achieved by combining with an emulsion acrylic, tacky pressure-sensitive adhesive with an emulsifiable wax, surfactant or mixtures thereof present in a concentration to reduce adhesivity of the adhesive to a level sufficiently low to allow removability and at the same time provide sufficient lubricity to afford excellent guillotinability.

The acrylic pressure-sensitive adhesive polymers used in the instant invention may be inherently tacky or tack provided by the inclusion of a tackifier or plasticizer added during the compounding stage. The adhesive may be used as such or whose tack is reduced by crosslinking. The wax and/or surfactant are provided during the compounding stage and cast as part of a homogenous emulsion to provide a pressure-sensitive adhesive coating at any desired uniform level of removability, as compared to the unmodified acrylic pressure-sensitive adhesive composition. This is in consequence of a reduction in adhesion level. The additive at the same time imparts excellent guillotinability. It is preferred to use either the wax alone or the surfactant alone with use of a surfactant being presently preferred.

Emulsifiable wax can be employed in the amount of about 0.5 to about 1.5% by weight of the acrylic emulsion polymer and wax. A surfactant can be employed in the amount of about 0.5 to about 3.5% by weight of the acrylic emulsion polymer and surfactant. When used in combination the total amount of wax and surfactant present should be less than about 3% by weight of the acrylic emulsion polymer and additive wax and surfactant.

It is presently preferred to employ an nonionic surfactant which is an polyethylene polyoxypropylene block copolymers and nonionic emulsified waxes.

The presently preferred emulsion acrylic adhesive is a crosslinked acrylic polymer based on 2-ethylhexyl acrylate, butyl acrylate and a carboxylic acid.

BRIEF DESCRIPTION OF THE DRAWINGS

FIG. 2 illustrates 90° peel adhesion for adhesives of the instant invention used with various backings for face stocks.

DETAILED DESCRIPTION

Figure 1:
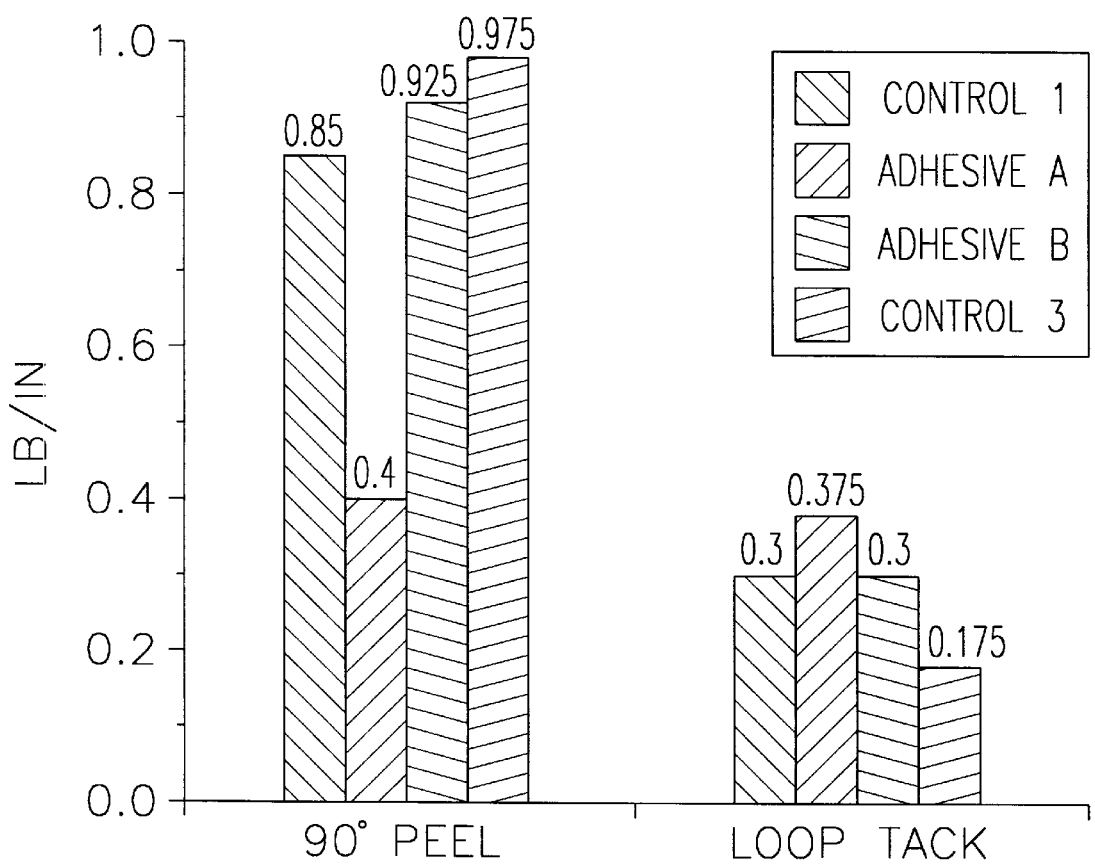
FIG. 1 illustrates 90° peel and looptack properties of adhesive compositions which conform to the instant invention in comparison to controls.

According to the present invention, there is provided pressure-sensitive adhesives which when cast from an emulsion onto a suitable backing or face stock display the properties of excellent guillotinability and repositionability.

Adhesives of the instant invention are based on the combination of an emulsion acrylic polymer preferably crosslinked, compounded in emulsion with an emulsifiable wax, a surfactant or mixtures thereof which when cast onto a suitable backing enables face stock guillotining for offset printing applications and removability and repositionability.

The acrylic emulsion pressure-sensitive adhesive polymers useful in accordance with the instant invention, contain on a percent by weight basis from 30 to about 98% percent by weight of one or more alkyl acrylates containing about 4 to about 8 carbon atoms in the alkyl group. Preferably the total alkyl acrylate concentration is from about 60 to about 95% by weight based on the total weight of the monomers. Useful alkyl acrylates include n-butyl acrylate, 2-ethylhexyl acrylate, isooctyl acrylate and the like, with 2-ethylhexyl acrylate and mixtures of 2-ethylhexyl acrylate and butyl acrylate being preferred.

The second component of the acrylate polymers is one of more modifying monomers which affects the performance of the acrylate monomers. Among them there may be included one or more unsaturated carboxylic acids containing from 3 to about 5 carbon atoms normally present in an amount of about 2 to 10% by weight of the monomers forming the acrylic polymers. Unsaturated carboxylic acid, included among others acrylic acid, methacrylic acid, itaconic acid and the like. Acrylic acid and methacrylic acid or mixtures thereof are presently preferred.

Other monomers which may be present are one or more vinyl esters which may be present in an amount of from about 15 to about 35% by weight of the total monomers and can include monomers such as vinyl acetate, vinyl butyrate, vinyl propanate, vinyl isobutarate and the like.

In addition there may be provided one or more diesters of dicarboxylic acids, such as di-2-ethylhexyl maleate and di-2-ethylhexyl fumarate and the like.

The acrylic polymers are normally are prepared by emulsion polymerization in the presence of one or more surfactants including a reactive surfactant which when reacted becomes part of the polymer. The acrylic polymer may be used as formed and, if desired, crosslinked either during or following polymerization by a conventional means and are provided as emulsion of the solids content of 50 or more percent by weight solids, normally 60 or more percent by weight solids.

The presently preferred acrylic emulsion polymer is a crosslinked acrylic polymer containing butyl acrylate, 2-ethylhexyl acrylate and an unsaturated carboxylic acid sold by Avery Chemical Company division of Avery Dennison Corporation.

To induce the repositionability and guillotinability the emulsion pressure-sensitive adhesives are combined with an emulsifiable wax, a surfactant or mixtures thereof which are combined with the acrylic pressure-sensitive adhesive polymer at the compounding stage. It is presently preferred that the additive be an emulsified nonionic surfactant. Preferably, the surfactant is a nonionic surfactant known as Pluronic F-108 a normally solid polyoxypropylene-polyoxethylene block copolymer having a molecular weight of about 14600 and an HLB value greater than 24. The surfactant is manufactured and sold by BASF.

Wax additives not only provide a special lubrication between the knife surface and the adhesive, but also dramatically reduces adhesion level. Wax emulsions include emulsified petroleum resins, paraffin waxes, oxidized paraffin waxes, microcrystalline waxes, carnauba waxes, montain waxes, polyethylene waxes and the like emulsified to form a nonionic wax emulsion. The presently preferred wax is ME47950 a nonionic paraffin wax emulsion manufactured and sold by Michelman Inc., of Cincinnati, Ohio.

The backing of face stock may vary widely and include paper face stocks, polymeric face stocks such as vinyl and acetate face stock. In the presently preferred construction the face stocks is cast coated high gloss paper, C2S matte litho paper, uncoated offset paper, recycled matte litho paper, latex saturated face paper, clear acetate, matte acetate, vinyl and the like, coated with adhesive to a level of 15 to 21, preferably 18 g/m² with the adhesive protected by a silicone release liner.

The products of the instant invention as illustrated by the Examples uniquely provide removability and guillotinability without developing curl even when paper is used as the face stock and in the release liner. It also displayed uniqueness as compared to other removable papers and tapes in that they displayed the ability to be removed from certain substrates without tear of the backing or face stock and yet provide a low enough adhesion to allow removability and repositionability.

For purpose of illustrating the invention there was used as the base adhesive the preferred commercial crosslinked acrylic emulsion polymer an emulsion polymerized mix of butyl acrylate, 2-ethylhexyl acrylate and an unsaturated carboxylic acid manufactured by Avery Chemical with the name 220X.

For Control 1 the emulsion polymer was used as received. For Examples 1 to 3 there was formulated an emulsion solution 220X, Pluronic F-108 a normally solid polyoxypropylene-polyoxyethylene block copolymer having an average molecular of 14600 and melting point of 57° C. and HLB of greater than 24 manufactured by BASF. It was dissolved in the dionized water to 220X emulsion to water and a coatable mixture having a solids content of about 52% solids and a viscosity of 7,000 cps (desired range 4,000–10,000 cps), as received containing mixture. The composition contained about 3% by weight surfactant based on the weight or surfactant and polymer (Adhesive A). Adhesive B was made the same way but contains about 2% surfactant.

The formulated emulsion contained 3% surfactant based on the weight of surfactants and polymer when coated on the backing described below in Table I has the following approximate properties at a coat weight of about 18 q/m².

TABLE 1

| | Example | | |
| --- | --- | --- | --- |
| | 1 | 2 | 3 |
| | Backing | | |
| Property | X[1] | Y[2] | Z[3] |
| Release, gr (16 hrs. aged) | 30 | 30 | 50 |
| 180° peel lb/in (16 hrs. aged) | 0.8 | 0.5 | 0.6 |

[1]Satin lithograph paper
[2]Blue-white high gloss
[3]Recycled matte litho

Table 2 and FIG. 1 compares adhesive coating performance of Control 1, Adhesive A and Adhesive B, Control 2 which contained 3% by weight polyethylene glycol and Control 3 containing 1% by weight polyethylene glycol. Polyethylene glycol was added by a aqueous 50% solution and exhibited phase separation.

Table 3 compares removable performance of the composition of Example 1 from various substrates and aging for the dwell time shown. "Yes" means removability. The conclusion drawn was that performance on glass, stainless steel and corrugated cardboard was good, but not good on painted metal, polyethylene and ABS substrates.

Table 4 compares the performance of the adhesive of Example 1 on a matte acetate backing. Based on the results it was concluded priming of the backing is required.

FIG. 2 is a block diagram compare peel adhesion in lb/in for Control 1 to the Adhesive A contained 3% surfactant on various backings.

When a 100 sheet stack of the construction of Example 1 was guillotined 15 times it was observed that both sides of the knife and stack were rated excellent with no build-up of adhesive on the stack or the blade.

Table 5 shows the performance of the adhesive of Control 1 compounded with 1% by weight wax based on the weight of the polymer and wax of a paraffin wax provided as a nonionic emulsion. This is Adhesive C. The emulsion was known as ME47950 paraffin wax having a melting point of 147° F., a solids content of 50% with an average particle size of 0.35 micron. The backing was Matte Litho. Overall guillotinability performance was excellent.

TABLE 2

|  | Cont. 1 | Adh. A | Adh. B | Cont. 2 | Cont. 3 |
|---|---|---|---|---|---|
| Coat Weight g/m² | 30 | 25 | 25 | 24 | 28 |
| 900 Peel, lb/in | .85 | .4 | .925 | 1.25 | .975 |
| Loop Tack, lb/in | .3 | .35 | .3 | .1 | .1 |
| Shear, min, 250 g, ½" × ½" | 580/621 | 425/721 | 239/324 | 331/461 | 451/672 |
| 24 Hour Removability (2 tests each tear means backing tear) |  |  |  |  |  |
| Glass | 2 tears | 0 tears | 0 tears | 0 tears | 1 tear |
| Painted Steel | 2 tears | 0 tears | 0 tears | 1 tear | 1 tear |
| Bleed into Paper Face Stock | No | No | No | Yes | Yes |

TABLE 3

| Dwell, Days | Glass | Painted Metal | Stainless Steel | ABS | PE | Corrugated Box | Paper |
|---|---|---|---|---|---|---|---|
| Room Temperature | | | | | | | |
| 7 | YES | YES | YES | PT | FS | YES | PT |
| 14 | YES | YES | YES | PT | FS | YES | PT |
| 17 | YES | YES | YES | PT | FS | YES | PT |
| 24 | YES | YES | YES | PT | FS | YES | PT |
| Oven at 50° C. | | | | | | | |
| 7 | YES | PT | YES |  | PT | YES | |
| 14 | YES | PT | YES |  | PT | YES | |
| 17 | YES | PT | PT |  | PT | YES | |

YES: GOOD REMOVABILITY
PT: PAPER TEAR
FS: FACE SEPARATION, ADHESIVE IS NOT ADHERED TO THE FACE STOCK

TABLE 4

| Dwell, Days | Glass | Painted Metal | Stainless Steel | ABS | PE | Corrugated Box | Paper |
|---|---|---|---|---|---|---|---|
| Room Temperature Aged | | | | | | | |
| 7 | FS | FS | FS | — | FS | YES | |
| 14 | FS | FS | FS | — | FS | YES with tissue | |

TABLE 4-continued

| Dwell, Days | Glass | Painted Metal | Stainless Steel | ABS | PE | Corrugated Box | Paper |
|---|---|---|---|---|---|---|---|
| 50° C. Aged | | | | | | | |
| 7 | FS | FS | FS | FS | FS | TEAR | |
| 14 | FS | FS | FS | FS | FS | TEAR | |

YES: GOOD REMOVABILITY
PT: PAPER TEAR
FS: FACE SEPARATION, ADHESIVE IS NOT ADHERED TO THE FACE STOCK

TABLE 5

| Dwell, Days | Glass | Painted Metal | Stainless Steel | ABS | PE | Corrugated Box | Paper |
|---|---|---|---|---|---|---|---|
| 7 | YES | YES | — | YES | — | YES | YES |
| 14 | YES | YES | — | YES | — | YES | YES |
| 18 | YES | YES | — | YES | — | YES | YES |
| 21 | YES | YES | — | YES | — | YES | SLIGHTLY TISSUE TEAR |
| 50° C. Aged | | | | | | | |
| 7 | YES | YES | — | YES | YES | YES | YES |
| 10 | YES | YES | — | YES | YES | YES | — |
| 24 | YES | YES | — | YES | YES | YES | — |

YES: GOOD REMOVABILITY
PT: PAPER TEAR
FS: FACE SEPARATION, ADHESIVE IS NOT ADHERED TO THE FACE STOCK

Attached Table 6 shows the removability performance of the Adhesive C deposited at a coat weight of 25 g/m² on Matte Litho backing. Table 7 shows the performance at 0.75% by weight of the wax (Adhesive D) and Table 8 shows performance at 0.5% by weight of the wax (Adhesive E). Removability and guillotinability were in all instances excellent.

In the ageing tests exposure at 50° C. for 1 week is equivalent to 6 months at room temperature and 2 weeks at 50° C. is equivalent to 1 year at room temperature.

TABLE 6

| Substrate | Aging Cond. | 90° Peel | Looptack | Edge lift | Failure | Remarks |
|---|---|---|---|---|---|---|
| Stainless steel | 1 wk/25° C. | 0.8 | 0.01 | none | panel | clean removability |
|  | 1 wk/50° C. | 1.15 | 0.01 | 1/64" | panel | clean removability |
|  | 2 wk/25° C. | 0.75 | 0.30 | 1/64" | panel | clean removability |
|  | 2 wk/50° C. | 1.4 | 0.30 | 1/64" | panel | clean removability |
| Glass | 1 wk/25° C. | 0.175 |  | 1/32" | panel | clean removability |
|  | 1 wk/50° C. | 0.65 |  | 1/64" | panel | clean removability |
|  | 2 wk/25° C. | 0.25 |  | 1/64" | panel | clean removability |
|  | 2 wk/50° C. | 1.0 |  | 1/64" | panel | clean removability |
| Painted M | 1 wk/25° C. | 0.75 |  | 1/64" | panel | clean removability |
|  | 1 wk/50° C. | 1.2 |  | 1/64" | panel | clean removability |
|  | 2 wk/25° C. | 0.85 |  | 1/64" | panel | clean removability |
|  | 2 wk/50° C. | 1.1 |  | 1/64" | panel | clean removability |
| Plastic | 1 wk/25° C. | 1.45 |  | 1/64" | panel stain | clean removability |
|  | 1 wk/50° C. | 2.05 |  | 1/64" | panel stain | clean removability |
|  | 2 wk/25° C. | 1.5 |  | 1/64" | panel stain | clean removability |
|  | 2 wk/50° C. | 1.9 |  | 1/64" | panel stain | clean removability |

TABLE 6-continued

| Substrate | Aging Cond. | 90° Peel | Looptack | Edge lift | Failure | Remarks |
|---|---|---|---|---|---|---|
| Corrugated | 1 wk/25° C. | 0.375 | | none | panel | clean removability |
| | 1 wk/50° C. | 0.425 | | 1/64" | panel | clean removability |
| | 2 wk/25° C. | 0.45 | | 1/64" | panel | clean removability |
| | 2 wk/50° C. | 0.5 | | 1/64" | panel | clean removability |
| Paper | 1 wk/25° C. | 0.85 | | 1/64" | panel | clean removability |
| | 1 wk/50° C. | 0.90 | | 1/16" | panel | clean removability |
| | 2 wk/25° C. | 1.15 | | 1/64" | panel | clean removability |
| | 2 wk/50° C. | 1.5 | | 1/32" | panel | clean removability |

TABLE 7

| Substrate | Aging Cond. | 90° Peel | Looptack | Edge lift | Failure | Remarks |
|---|---|---|---|---|---|---|
| Stainless steel | 1 wk/25° C. | 0.975 | 0.01 | none | panel | clean removability |
| | 1 wk/50° C. | 1.35 | 0.01 | 1/64" | panel | clean removability |
| | 2 wk/25° C. | 0.9 | 0.01 | 1/64" | panel | clean removability |
| | 2 wk/50° C. | 1.55 | 0.01 | 1/64" | panel | clean removability |
| Glass | 1 wk/25° C. | 0.30 | | none | panel | clean removability |
| | 1 wk/50° C. | 0.75 | | 1/64" | panel | clean removability |
| | 2 wk/25° C. | 0.4 | | 1/64" | panel | clean removability |
| | 2 wk/50° C. | 0.95 | | 1/64" | panel | clean removability |
| Painted M | 1 wk/25° C. | 1.05 | | 1/64" | panel | clean removability |
| | 1 wk/50° C. | 0.45 | | 1/64" | panel | clean removability |
| | 2 wk/25° C. | 1.0 | | 1/64" | panel | clean removability |
| | 2 wk/50° C. | 0.85 | | 1/64" | panel | clean removability |
| Plastic | 1 wk/25° C. | 1.75 | | 1/64" | panel stain | clean removability |
| | 1 wk/50° C. | 1.65 | | 1/64" | panel stain | clean removability |
| | 2 wk/25° C. | 1.65 | | 1/64" | panel stain | clean removability |
| | 2 wk/50° C. | 2.15 | | 1/64" | panel stain | clean removability |
| Corrugated | 1 wk/25° C. | 0.80 | | none | panel | clean removability |
| | 1 wk/50° C. | 0.775 | | 1/64" | panel | clean removability |
| | 2 wk/25° C. | 0.63 | | 1/64" | panel | clean removability |
| | 2 wk/50° C. | 0.75 | | 1/64" | panel | clean removability |
| Paper | 1 wk/25° C. | 1.0 | | 1/64" | panel | clean removability |
| | 1 wk/50° C. | 0.90 | | 1/16" | panel | clean removability |
| | 2 wk/25° C. | 0.95 | | 1/64" | panel | clean removability |
| | 2 wk/50° C. | 1.2 | | 1/64" | panel | clean removability |

TABLE 8

| Substrate | Aging Cond. | 90° Peel | Looptack | Edge lift | Failure | Remarks |
|---|---|---|---|---|---|---|
| Stainless steel | 1 wk/25° C. | 1.2 | 0.01 | 1/32" | panel | clean removability |
| | 1 wk/50° C. | 1.3 | 0.01 | 1/64" | panel | clena removability |
| | 2 wk/25° C. | 1.1 | 0.01 | 1/64" | panel | clean removability |
| | 2 wk/50° C. | 1.45 | 0.01 | 1/64" | panel | clean removability |
| Glass | 1 wk/25° C. | 0.325 | | none | panel | clean removability |
| | 1 wk/50° C. | 1.2 | | 1/64" | panel | clean removability |
| | 2 wk/25° C. | 0.5 | | 1/64" | panel | clean removability |
| | 2 wk/50° C. | Tear | | 1/64" | Tear | Tear |
| Painted M | 1 wk/25° C. | 1.0 | | none | panel | clean removability |
| | 1 wk/50° C. | 1.3 | | 1/64" | panel | clean removability |
| | 2 wk/25° C. | 1.2 | | 1/64" | panel | clean removability |
| | 2 wk/50° C. | Tear | | 1/64" | Tear | clean removability |
| Plastic | 1 wk/25° C. | 1.8 | | none | panel stain | clean removability |
| | 1 wk/50° C. | 1.7 | | 1/64" | panel stain | clean removability |
| | 2 wk/25° C. | 1.5 | | 1/64" | panel stain | clean removability |
| | 2 wk/50° C. | 2.25 | | 1/64" | panel stain | clean removability |
| Corrugated | 1 wk/25° C. | 0.425 | | none | panel | clean removability |
| | 1 wk/50° C. | 0.425 | | 1/64" | panel | clean removability |
| | 2 wk/25° C. | 0.7 | | 1/64" | panel | clean removability |
| | 2 wk/50° C. | 0.55 | | 1/64" | panel | clean removability |
| Paper | 1 wk/25° C. | 0.95 | | none | panel | clean removability |
| | 1 wk/50° C. | 1.00 | | 1/64" | panel | clean removability |
| | 2 wk/25° C. | 0.95 | | 1/64" | panel | clean removability |
| | 2 wk/50° C. | 1.2 | | 1/64" | panel | clean removability |

We claim:

1. A guillotinable and substrate-removable pressure-sensitive adhesive composition comprising a tacky, crosslinked, acrylic emulsion polymer in admixture with from about 0.5 to about 1.5% by weight of an emulsifiable wax, based on the weight of the acrylic emulsion polymer and emulsifiable wax.

2. A pressure-sensitive adhesive composition as recited in claim 1, wherein the emulsifiable wax is a paraffin wax.

3. A guillotinable and removable pressure-sensitive adhesive stock comprising a backing providing on a surface thereof a coating of a guillotinable and removable pressure-sensitive adhesive composition comprising a crosslinked acrylic emulsion polymer in admixture with from about 0.5 to about 1.5% of an emulsifiable wax, based on the weight of the emulsifiable wax and acrylic emulsion polymer.

4. A pressure-sensitive adhesive stock as recited in claim 3, wherein the backing is selected from the group consisting of paper and polymeric sheet.

5. A pressure-sensitive adhesive stock as recited in claim 3, wherein the backing is selected from the group consisting of matte litho paper, cast coated high gloss paper, uncoated offset paper, recycled matte litho paper, latex saturated face paper, clear acetate and matte acetate.

6. A pressure-sensitive adhesive as recited in claim 3, wherein the emulsifiable wax is a paraffin wax.

* * * * *

UNITED STATES PATENT AND TRADEMARK OFFICE
CERTIFICATE OF CORRECTION

PATENT NO. : 5,939,479
DATED : August 17, 1999
INVENTOR(S) : Jessie C. Reaves; Shiaonung J. Su; Peter R. von Kleist It is certified that error appears in the above-identified patent and that said Letters Patent is hereby corrected as shown below:

<u>Title page, Item [56],</u>
Reference Cited, under "U.S Patent Documents" insert the following two references:

-- 5,034,454    7/1991    Maska .......... 524/763
    5,073,457    12/1991    Blackwell ....... 428/484

Signed and Sealed this

Eleventh Day of September, 2001

Attest:

NICHOLAS P. GODICI
*Attesting Officer*    *Acting Director of the United States Patent and Trademark Office*